United States Patent [19]

Balducci et al.

[11] 4,097,300

[45] Jun. 27, 1978

[54] INORGANIC PIGMENTS AND PROCESS FOR PREPARING SAME

[75] Inventors: Luigi Balducci; Dino Sarti; Fausto Gerelli, all of Alessandria, Italy

[73] Assignee: Montedison S.p.A., Milan, Italy

[21] Appl. No.: 816,889

[22] Filed: Jul. 18, 1977

[30] Foreign Application Priority Data

Jul. 20, 1976 Italy .................................. 25495/76

[51] Int. Cl.$^2$ .............................................. C09C 1/36
[52] U.S. Cl. ...................................... 106/299; 106/300; 106/306; 106/288 B; 423/593; 423/598; 423/600
[58] Field of Search ..................... 106/299, 300, 306; 423/593, 598, 600

[56] References Cited

U.S. PATENT DOCUMENTS

| | | | |
|---|---|---|---|
| 2,992,931 | 7/1961 | Merker | 423/598 |
| 3,424,551 | 1/1969 | Owen | 106/299 |
| 3,876,441 | 4/1975 | Broll et al. | 423/598 |

*Primary Examiner*—Winston A. Douglas
*Assistant Examiner*—J. V. Howard
*Attorney, Agent, or Firm*—Morgan, Finnegan, Pine, Foley & Lee

[57] ABSTRACT

The present invention relates to new inorganic pigments and to a process for preparing same. More particularly, it relates to new yellowish-green pigments consisting of titanium compounds. These pigments consist of the crystalline phases rutile $TiO_2$, perovskite $CaCO_3$ and trigonal $CoTiO_3$. They contain 2 to 12% by weight of cobalt and 4 to 20% by weight of calcium based on total $TiO_2$ and they have a dominant wave length $\lambda_D$ comprised between 530 and 560 m$\mu$.

6 Claims, No Drawings

INORGANIC PIGMENTS AND PROCESS FOR PREPARING SAME

BACKGROUND OF THE INVENTION

As is known, the most commonly used yellowish-green pigment is the green chromic oxide $Cr_2O_3$. Such pigment has the drawback of being toxic.

It is known too that it is possible to obtain from the titanium dioxide pigment of rutile structure (that it is white) pigments based on titanium compounds showing different colours by reacting said $TiO_2$ pigment with compounds of different elements such as, for example, Ni, Cr and Co.

For instance, a bluish-green pigment has been obtained by calcination of $TiO_2$ with a cobalt salt and, optionally an aluminium salt (in the latter case the $Al_2O_3$/Co molar ratio in the starting mixture shall be lower than 1).

OBJECTS OF THE INVENTION

Thus it is an object of the present invention to provide new yellowish-green pigments free from chrome.

Another object is to provide the above-said pigments in the form of titanium compounds.

A further object is to provide a process useful to obtain the above-said pigments.

GENERAL DESCRIPTION OF THE INVENTION

These and still other objects are achieved by coloured pigments based on titanium compounds, which pigments consist of the crystalline phases rutile $TiO_2$, perovskite $CaCO_3$ and trigonal $CoTiO_3$; contain from 2 to 12% by weight of cobalt and from 4 to 20% by weight of calcium referred to the total $TiO_2$ (i.e. the $TiO_2$ present both in the form of $TiO_2$ and in the form of $CaTiO_3$ and $CoTiO_3$) and have a dominant wave length $\lambda_D$ comprised between 530 and 560 m$\mu$.

The pigments according to this invention may also contain aluminium; in such amount, that the molar ratio between $Al_2O_3$ and Co is generally comprised between 0.01 and 0.20. Therefore, calculated in respect of the total $TiO_2$ of the pigments, the Al amount generally ranges from 0.018 to 2.197% by weight, depending on the Co amount contained in the pigment.

In fact it has been found, according to this invention, that while the pigments based on titanium compounds containing Co or Co and Al 1 (with $Al_2O_3$/Co molar ratio lower than 1) exhibit a bluish-green colour, the addition of Ca to the above-said systems permits one to obtain yellowish-green products, i.e., having a $\lambda_D$ of 530-560 m$\mu$.

The preponderant crystal phase of the pigments according to the present invention is that of rutile $TiO_2$. Calcium titanate $CaTiO_3$ having the monoclinic crystal structure of perovskite and cobalt titanate $CoTiO_3$ having a trigonal crystal structure are present as well. The perovskite amount increases as the calcium amount in the pigment increases. Similarly, the $CoTiO_3$ phase increases as the cobalt amount increases. The pigments containing Al do not show any crystalline phase of an aluminium compound. This depends at least in part on the fact that the quantity of Al present is low. It is also supposed that at least a part of the Al has been entered into the crystalline lattice of the rutile $TiO_2$, modifying said lattice, according to a known phenomenom, described, e.g., in the United States Patent 3.022.186.

The pigments of this invention exhibit a roundish shape and have a diameter generally comprised between 0.5 and 3.0$\mu$.

The colour of the pigments has been defined by their dominant wave length $\lambda_D$ (see A. G. Hardy: Handbook of Colorimetry; Massachusetts Institute of Technology; Cambridge, Massachusetts, 1936, in particular page 11).

The $\lambda_D$ of the obtained products covers the entire range of the yellowish-green shades, namely from 530 to 560 m$\mu$.

Thus it is possible to obtain also products having the same $\lambda_D$ as the commercial green chromic oxides, i.e., a $\lambda_D$ of about 554 m$\mu$.

The cobalt amount ranges from 2 to 12% by weight in respect of $TiO_2$ (we always refer to the total $TiO_2$, as defined previously). It is possible to use lesser amounts of cobalt, but in such case the resulting shades are too light. It is also possible to use higher amounts thereof, but it is preferable not to exceed 12% in order to limit the cost of the product. Cobalt amounts ranging from 5 to 12% are preferably employed. Under these conditions the products obtained exhibit a good colour strength comparable to that of the chromic oxide green pigments.

The calcium amount ranges from 4 to 20% by weight in respect to $TiO_2$, the amount preferably used ranging from 8 to 20%.

In general, the aluminum amount is such as to obtain an $Al_2O_3$/Co molar ratio comprised between 0.01 and 0.20.

As it will appear later on, the presence of aluminum permits, among other things, to prepare the pigments at on the average lower temperatures, wherefore it is easier to control the pigments' sizes.

The cobalt amount being the same, the increase of the aluminum amount, in the range from 0.01 to 0.20, causes the $\lambda_D$ to decrease, shifting it towards bluish-green.

Aluminum amounts higher than a ratio of 0.20 are generally undesired, because they can lower the $\lambda_D$ to values below 530 m$\mu$. The preferred ratio is comprised between 0.10 and 0.20.

Preferred pigments are those containing from 5 to 12% by weight of Co and from 8 to 20% by weight of Ca based on $TiO_2$; such preferred pigments may also contain Al the $Al_2O_3$/Co molar ratio ranging from 0.01 to 0.20 and, more preferably, from 0.10 to 0.20.

The process according to the present invention consists in preparing a mixture of $TiO_2$, CoO and CaO and, in case, $Al_2O_3$ or compounds of the same metals capable of yielding the above-mentioned oxides in the successive calcining operation, and in calcining the mixture so obtained, at temperatures generally ranging from 950° to 1150° C, in the presence of air.

The amounts of Co, Ca and Al compounds to be used are selected as a function of the desired pigment composition. Generally, the amounts employed are such that the element content, calculated in respect of the starting $TiO_2$, is comprised between 2 and 12% for Co, between 4 and 20% for Ca and between 0.018 and 2.197% for Al; the aluminum amount is such that the $Al_2O_3$/Co molar ratio ranges from 0.01 to 0.20.

$TiO_2$ or compounds capable of providing it during calcination mean in particular:

$TiO_2$ having a rutile or anatase structure, whose particles have, for example, a mean diameter comprised between 0.2 and 0.4$\mu$;

The hydrated forms of $TiO_2$; particularly suited to this purpose is the gel of the meta-titanic acid Ti- $O_2.H_2O$ purified from iron, that is obtained as an intermediate product in the processes for preparing the $TiO_2$ pigments via titanyl sulphate (see, e.g., Kirk Othmer, Encyclopedia of Chemical Technology, II Edition, Vol. 20, pages 401-404, Interscience Publisher, New York 1969).

Besides CoO, CaO and $Al_2O_3$, it is possible to use the cobalt, calcium and aluminium compounds that decompose to CoO, CaO and $Al_2O_3$ at temperatures not higher than the abovesaid calcination temperatures: for example—cobalt sulphate, nitrate, acetate and sulphide; calcium nitrate and carbonate and aluminum sulphate.

The preferred source of $TiO_2$ is the gel of $TiO_2.H_2O$.

Admixing of the starting compounds is generally effected in water, for example, at room temperature; admixing is carried on for a time period sufficient to ensure a good homogenization, such, for example, a 10 to 60 minutes mixing period.

The mixture can then be dried, for example, at 110°–130° C. The dried product is then homogenized by grinding and subjected to calcination.

When use is made of a furnace capable of ensuring a good mixing of the material to be calcined, for example, a rotary furnace, drying can be omitted. The furnace can be directly fed with the paste obtained at the conclusion of the admixing step.

Calcination is generally conducted at 950°–1150° C, in the presence of air, employing a residence time preferably comprised between 1 hour and 3 hours. Generally it is preferable to avoid working at temperatures higher than 1150° C, as in such case the pigment particles could tend to become too large.

Calcination temperatures are selected as a function of the pigments to be obtained, taking the following factors into account:

In the presence of aluminum, calcination can be carried out at lower temperatures;

Either in the absence or in the presence of aluminum, calcination can be carried out at lower temperatures when the product contains relatively high amounts of both calcium and cobalt.

Calcination temperatures are preferably selected — as a function of the desired product — in the ranges reported on Table A.

Thus, the preferred products, i.e., those containing from 5 to 12% of cobalt and from 8 to 20% of calcium, and optionally aluminum, are generally obtained at temperatures comprised between about 1000° C and about 1150° C.

The pigments object of the present invention can be used in the fields in which the coloured inorganic pigments are commonly used, i.e., in particular, as coloured pigments for paints and plastic materials.

The following examples are given to better illustrate the inventive idea of the present invention.

SPECIFIC DESCRIPTION OF THE INVENTION

EXAMPLE 1

As a $TiO_2$-generating compound use was made of a gel of metatitanic acid at 32.8% of $TiO_2$, purified from iron, obtained as an intermediate product in the production of $TiO_2$ via titanyl sulphate; its impurities total content was lower than 200 ppm calculated on $TiO_2$. 11.85 g of $Co(NO_3)_3.6H_2O$ dissolved in 20 cc of water and 6 g of $CaCO_3$ were added to 61 g of gel, corresponding to 20 g of anhydrous $TiO_2$. The paste was homogenized under stirring at room temperature and dried at about 110° C. The dry product was pulverized in a mortar; it was placed into a crucible and calcined in a muffle furnace, in the presence of air, at 1000° C. The product was kept at such temperature for 1 hour, whereupon it was cooled and pulverized in a mortar.

The product contained 11.4% by weight of cobalt and 12.0% of calcium (in respect to $TiO_2$).

Its colorimetric characteristics were determined on a dry paint film prepared starting from a vehicle made up of:

| | |
|---|---|
| Aroplaz 1279 (commercial alkyd resin: 68% by weight; soybean oil: 32% | 76.3 % |
| FL 30 (boiled linseed oil) | 19.0 % |
| Drying mixture | 4.7 % |

The drying mixture had the following composition:

| | |
|---|---|
| Calcium naphthenate | 1.77 % |
| Zirconium naphthenate | 5.31 % |
| Cobalt naphthenate | 6.9 % |
| White spirit | 86.02 % |

On a dry paint film of 50μ thickness, containing 50% by weight of pigment (calculated on the dry paint), tristimulus values X, Y, Z were measured in respect of a standard calibrated to magnesium oxide by means of a differential tristimulus colorimeter Ducolor, mod. 220, manufactured by Neotec Instruments Corp.

The obtained values were processed according to the C.I.E. (Commission Internationale de l'Eclairage) coordinates system and the dominant wave length was de-

TABLE A

| Product composition | | | |
|---|---|---|---|
| Cobalt (% b.w. in respect to $TiO_2$) | Calcium (% b.w. in respect to $TiO_2$) | Aluminium | Calcination temperature |
| 2–5 | 4–20 | absent or present in an $Al_2O_3$/Co ratio lower than 0.10 | about 1100 to about 1150° C |
| >5–12 | ≧4 and lower than 8 | absent or present in an $Al_2O_3$/Co ratio lower than 0.10 | about 1100 to about 1150° C |
| >5–12 | ≧8 up to 20 | absent or present in an $Al_2O_3$/Co ratio lower than 0.10 | about 1000 to about 1150° C |
| 2–6 | 4–20 | present in an $Al_2O_3$/Co ratio of 0.10 to 0.20 | about 1000 to about 1150° C |
| >6 up to 12 | ≧4 and lower than 12 | present in an $Al_2O_3$/Co ratio of 0.10 to 0.20 | about 1000 to about 1150° C |
| >6 up to 12 | ≧12 up to 20 | present in an $Al_2O_3$/Co ratio of 0.10 to 0.20 | about 950 to about 1150° C. |

The calcined and cooled product is successively ground until, e.g., its residue on a 325 mesh screen does not exceed 0.1% by weight.

termined graphically (for further details see the above-cited treatise by A. G. Hardy). The $\lambda_D$ resulted to be of 555 mμ. A commercial pigment of green chromic oxide $Cr_2O_3$, examined according to the same method, exhibited a $\lambda_D$ of 554 mµ.

The X-ray diffractogram of the product according to this invention revealed the presence of rutile $TiO_2$, that represented the predominant phase, of $CaTiO_3$ having the perovskite structure and of trigonal $CoTiO_3$.

The mean size of the ground pigment particles was of about 1.0 µ.

By way of comparison, the test was repeated without adding —calcium carbonate. The product obtained, which contained 11.4% of cobalt, exhibited a $\lambda_D$ of 495 mµ.

Thus it is clear that the presence of calcium in the pigment shifted the $\lambda_D$ from bluish-green to yellowish-green.

EXAMPLE 2

11.85 g of $Co(NO_3)_2.6H_2O$ dissolved in 20 cc of $H_2O$, 6 g of $CaCO_3$ and variable amounts of a solution of $Al_2(SO_4)_3 \cdot 18H_2O$ at 259 g/l were added, to 61 g of meta-titanic acid gel, as described in Example 1. More precisely, 10 cc of the aluminum sulphate solution were added in test 2a, and 20 cc in test 2b. It was operated according to the modalities of Example 1, calcining having been conducted at 1000° C. The characteristics of the resulting products are reported on Table B.

TABLE B

| Test No. | % b.w. of Co in respect to $TiO_2$ | % b.w. of Ca in respect to $TiO_2$ | % b.w. of Al in respect to $TiO_2$ | $Al_2O_3$/Co molar ratio | $\lambda_D$ in mµ |
|---|---|---|---|---|---|
| 2a | 11.4 | 12 | 1.05 | 0.1 | 552 |
| 2b | 11.4 | 12 | 2.10 | 0.2 | 545 |

The x-ray diffractometric analysis revealed the presence of rutile $TiO_2$, of perovskite $CaTiO_3$ and of trigonal $CoTiO_3$.

From Table B it can be inferred that the value of $\lambda_D$ lowers as the Al amount increases.

EXAMPLES 3 TO 13

The modalities of Example 1 were followed, but varying the calcium and aluminum amounts (while the cobalt amount remained unchanged) and the calcining temperatures.

By way of comparison, tests 3 and 4 were carried out without calcium.

TABLE C

| Test No. | % of Co in respect to $TiO_2$ | % of Ca in respect to $TiO_2$ | % of Al in respect to $TiO_2$ | Molar ratio $Al_2O_3$/Co | Calcining temp. | $\lambda D$ in mµ |
|---|---|---|---|---|---|---|
| 3 | 11,4 | — | — | — | 1000° C | 495 |
| 4 | 11,4 | — | — | — | 1100° C | 498 |
| 5 | 11,4 | 4 | — | — | 1000° C | 536 |
| 6 | 11,4 | 4 | — | — | 1100° C | 554 |
| 7 | 11,4 | 4 | 2,10 | 0,2 | 1000° C | 536 |
| 8 | 11,4 | 8 | — | — | 1000° C | 555 |
| 9 | 11,4 | 20 | — | — | 1000° C | 534 |
| 10 | 11,4 | 20 | — | — | 1100° C | 554 |
| 11 | 11,4 | 20 | 2,10 | 0,2 | 1000° C | 551 |
| 12 | 11,4 | 20 | 2,10 | 0,2 | 1100° C | 551 |
| 13 | 11,4 | 20 | 2,10 | 0,2 | 950° C | 551 |

By comparing tests 3–4 with test 5–6 one may notice that the addition of calcium to the $TiO_2$-Co system shifts the wave length from bluish-green to yellowish-green. By comparing test 5 with test 6 and test 9 with test 10 one may notice that the rise of the calcining temperature causes the $\lambda_D$ to increase. By comparing tests 9–10 with tests 11–13 one may notice that in the presence of aluminum it is possible to calcine at lower temperatures.

The product of test 8 exhibited a particle's mean diameter of 0.8 µ.

EXAMPLES 14 to 30

It was operated according to the modalities of Example 1, but varying the amounts of Co, Ca and Al and the calcining temperatures.

These temperatures and the characteristics of the resulting products are reported on Table D.

| Test 21 | 1.0 µ |
|---|---|
| Test 22 | 1.3 µ |
| Test 23 | 1.0 µ |
| Test 30 | 0.5 µ |

TABLE D

| Test No. | % of Co in respect to $TiO_2$ | % of Ca in respect to $TiO_2$ | % of Al in respect to $TiO_2$ | $Al_2O_3$/Co molar ratio | Calcining temperature | $\lambda D$ in mµ |
|---|---|---|---|---|---|---|
| 14 | 2 | 4 | — | — | 1100° C | 548 |
| 15 | 2 | 20 | — | — | 1100° C | 558 |
| 16 | 2 | 4 | 0,36 | 0,2 | 1000° C | 552 |
| 17 | 2 | 20 | 0,36 | 0,2 | 1000° C | 559 |
| 18 | 4 | 4 | — | — | 1100° C | 552 |
| 19 | 4 | 20 | — | — | 1100° C | 555 |
| 20 | 6 | 4 | — | — | 1100° C | 553 |
| 21 | 6 | 12 | — | — | 1000° C | 549 |
| 22 | 6 | 12 | — | — | 1100° C | 557 |
| 23 | 6 | 20 | — | — | 1000° C | 558 |
| 24 | 6 | 4 | 1,08 | 0,2 | 1000° C | 540 |
| 25 | 6 | 12 | 0,54 | 0,1 | 1000° C | 556 |
| 26 | 6 | 12 | 0,54 | 0,1 | 1100° C | 556 |
| 27 | 6 | 12 | 0,54 | 0,1 | 950° C | 556 |
| 28 | 6 | 12 | 1,08 | 0,2 | 1000° C | 550 |
| 29 | 6 | 12 | 1,08 | 0,2 | 1100° C | 553 |
| 30 | 6 | 12 | 1,08 | 0,2 | 950° C | 550 |

What we claim is:

1. A coloured pigment based on titanium compounds characterized in that it consists of the crystalline phases rutile $TiO_2$, perovskite $CaTiO_3$ and trigonal $CoTiO_3$; it contains 2 to 12% by weight of cobalt and 4 to 20% by weight of calcium, based on the weight of the total $TiO_2$, and it has a dominant wave length $\lambda_D$ comprised between 530 and 560 mµ.

2. A coloured pigment according to claim 1, characterized in that it contains also aluminium in such amount that the $Al_2O_3$/Co molar ratio is comprised between 0.01 and 0.20.

3. A coloured pigment according to claim 1, characterized in that the cobalt amount ranges from 5 to 12% by weight, based on the weight of the total $TiO_2$.

4. A coloured pigment according to claim 1, characterized in that the calcium amount ranges from 8 to 20% by weight, based on the weight of the total $TiO_2$.

5. A coloured pigment according to claim 2, characterized in that the $Al_2O_3$/Co molar ratio ranges from 0.10 to 0.20.

6. A coloured pigment according to claim 2, characterized in that the cobalt amount is comprised between 5 and 12% by weight, based on the weight of the total $TiO_2$, and the calcium amount between 8 and 20% by weight, based on the weight of the total $TiO_2$, the $Al_2O_3$/Co molar ratio being comprised between 0.10 and 0.20.

* * * * *